United States Patent
Hubner et al.

(10) Patent No.: US 9,129,127 B2
(45) Date of Patent: Sep. 8, 2015

(54) SECURE MOBILE INTERFACE ACCESS SYSTEM

(75) Inventors: Paul V. Hubner, McKinney, TX (US); Robert A. Clavenna, II, Lucas, TX (US); Kristopher A. Pate, Flower Mound, TX (US); Steven T. Archer, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 399 days.

(21) Appl. No.: 13/356,040

(22) Filed: Jan. 23, 2012

(65) Prior Publication Data

US 2013/0191885 A1    Jul. 25, 2013

(51) Int. Cl.
*G06F 21/00* (2013.01)
*G06F 21/62* (2013.01)
*H04L 12/24* (2006.01)
*G06F 11/07* (2006.01)

(52) U.S. Cl.
CPC ........ *G06F 21/6218* (2013.01); *H04L 41/5061* (2013.01); *G06F 11/0748* (2013.01)

(58) Field of Classification Search
CPC ............ G06F 21/6218; G06F 11/0748; H04L 63/0853; H04L 67/34
See application file for complete search history.

(56) References Cited

U.S. PATENT DOCUMENTS

| | | | |
|---|---|---|---|
| 6,757,837 B1 * | 6/2004 | Platt et al. | 714/38.13 |
| 6,882,712 B1 * | 4/2005 | Iggulden et al. | 379/102.03 |
| 6,889,510 B2 * | 5/2005 | Song et al. | 62/132 |
| 7,355,730 B2 * | 4/2008 | Landau et al. | 358/1.14 |
| 2002/0082924 A1 * | 6/2002 | Koether | 705/15 |
| 2006/0236325 A1 * | 10/2006 | Rao et al. | 719/315 |
| 2007/0225828 A1 * | 9/2007 | Huang et al. | 700/11 |
| 2008/0167127 A1 * | 7/2008 | Turkstra et al. | 463/40 |
| 2008/0167128 A1 * | 7/2008 | Roshak et al. | 463/40 |
| 2008/0167133 A1 * | 7/2008 | White et al. | 463/43 |
| 2009/0078760 A1 * | 3/2009 | Sherman et al. | 235/380 |
| 2010/0112997 A1 * | 5/2010 | Roundtree | 455/420 |
| 2010/0268401 A1 * | 10/2010 | Blakemore et al. | 701/2 |
| 2011/0113087 A1 * | 5/2011 | Lazaridis | 709/203 |
| 2011/0202798 A1 * | 8/2011 | Vera et al. | 714/27 |
| 2011/0294466 A1 * | 12/2011 | Tang et al. | 455/411 |
| 2012/0129492 A1 * | 5/2012 | Mechaley, Jr. | 455/411 |
| 2012/0221893 A1 * | 8/2012 | Bai et al. | 714/27 |
| 2012/0226619 A1 * | 9/2012 | Ryoo et al. | 705/304 |
| 2012/0324067 A1 * | 12/2012 | Hari et al. | 709/222 |
| 2014/0028449 A1 * | 1/2014 | Sigal et al. | 340/12.5 |
| 2014/0173059 A1 * | 6/2014 | Koningstein et al. | 709/220 |

* cited by examiner

*Primary Examiner* — Jung Kim
*Assistant Examiner* — James J Wilcox

(57) ABSTRACT

A method performed by one or more server devices connected to a mobile device via a network, the mobile device being connected to an electronic device is provided that can include sending, by the one or more server devices and to the mobile device, data initiating a session between the one or more server devices and the mobile device; sending a request for information about the electronic device; receiving the requested information about the electronic device; identifying device credentials for the electronic device and communication protocols for communicating with the electronic device; providing the device credentials for the electronic device and the communication protocols for communicating with the electronic device; automatically gathering information about the electronic device from data stored on the electronic device using the communication protocols and the mobile device; and providing support to the electronic device via the mobile device.

20 Claims, 11 Drawing Sheets

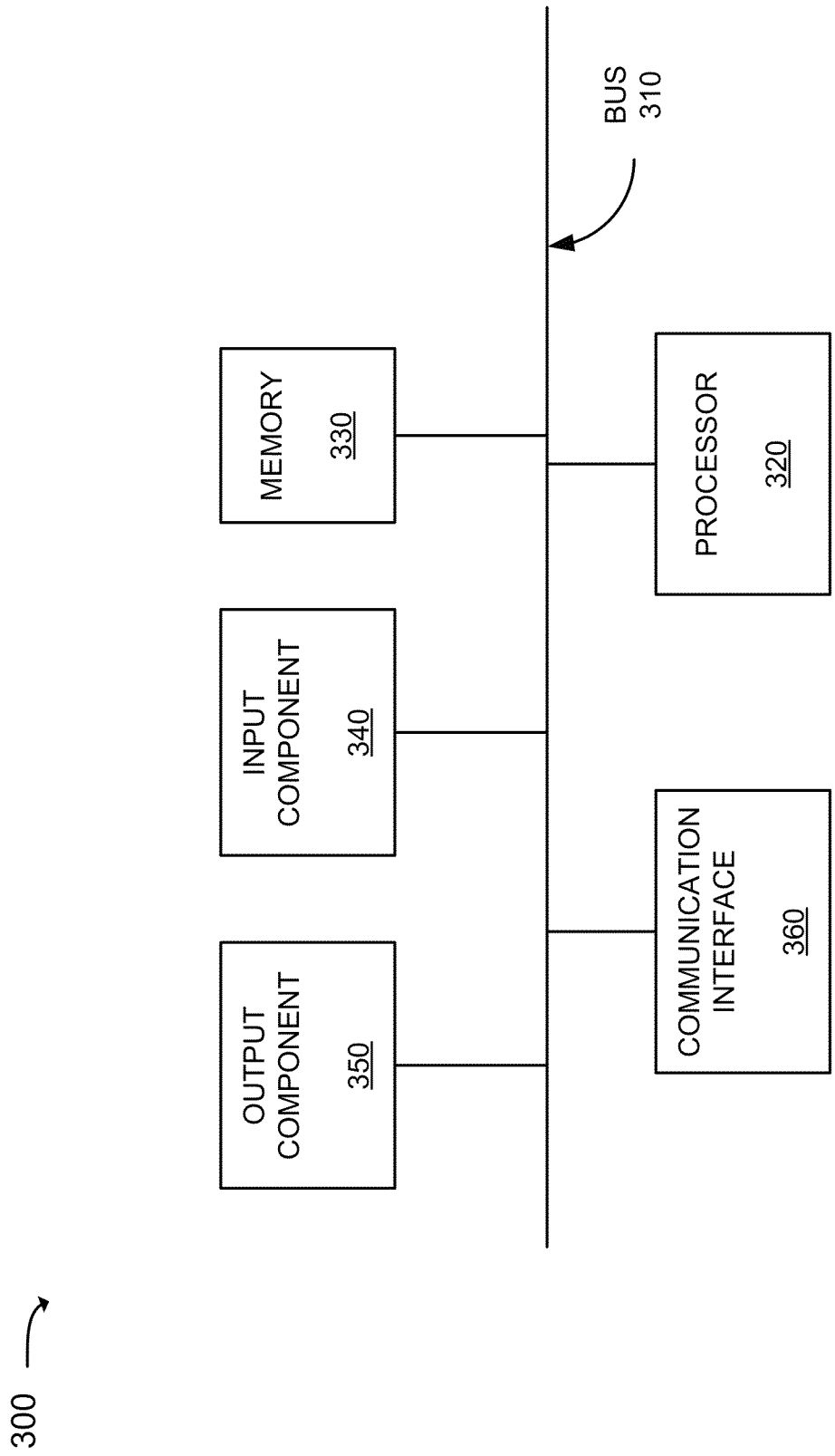

SECURE MOBILE INTERFACE ACCESS SYSTEM

BACKGROUND

Electronic devices, such as televisions, set-top boxes, routers, modems, dishwashers, refrigerators, etc. have been used to provide services to customers for many years. When the electronic devices fail, services are often lost and service providers are needed to repair or replace the electronic devices.

Installing and repairing electronic devices have been done by service providers' mobile technicians through service calls (e.g., house calls) using dedicated connections (e.g., wired connections to dedicated repair devices). The service calls can be inconvenient to customers and costly for service providers. Additionally, service outages, such as natural disasters, can cause the dedicated connections to be disrupted (e.g., technician unavailability, loss of network connection, etc.).

BRIEF DESCRIPTION OF THE DRAWINGS

FIG. 3 is a diagram of example components of one or more of the devices of FIGS. 1 and 2;

DETAILED DESCRIPTION OF PREFERRED EMBODIMENTS

The following detailed description refers to the accompanying drawings. The same reference numbers in different drawings may identify the same or similar elements.

Systems and/or methods, described herein, may allow support for an electronic device by using a mobile device (e.g., a smart phone or tablet computer) at a location of the electronic device to connect the electronic device to a support provider. By connecting the electronic device to the mobile device, the support provider install, activate, diagnose, and/or repair the electronic device.

The support provider can provide support via an ad-hoc data connection through the mobile device, and/or via voice, video, or other types of communications for setting up the ad-hoc data connection and for providing assistance with the installation, activation, diagnosis, and/or repair of the electronic device.

Figure 1:
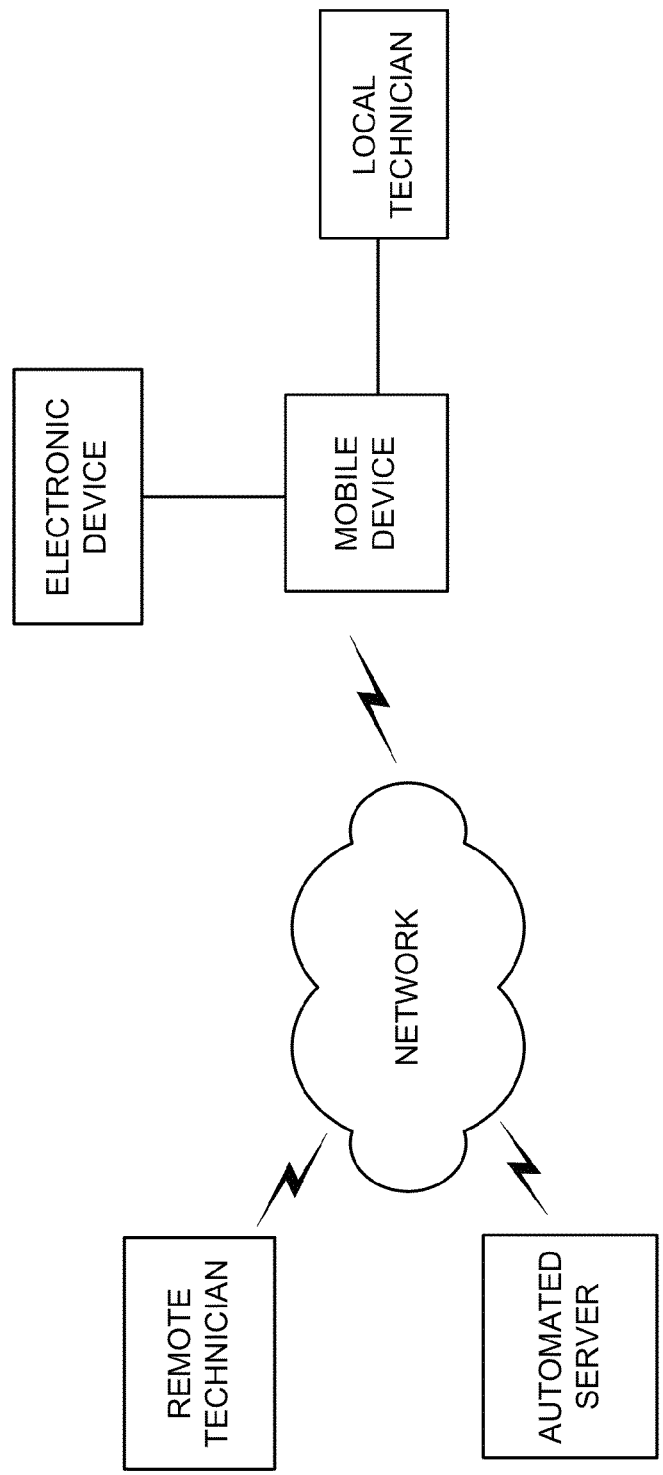
FIG. 1 is a diagram of an overview of example implementations, described herein.

FIG. 1 is a diagram of an overview of example implementations, described herein. As illustrated in FIG. 1, an electronic device could be connected through a mobile device to: a local technician; an automated server; and/or a remote technician.

Service providers, such as cable and satellite television operators, appliance repair servicing companies, internet service providers, etc., can provide support to an electronic device, such as a set-top box, a washing machine, a router, etc., through a local or remote technician, or an automated server.

In one implementation described herein, as illustrated in FIG. 1, a local technician can locally connect to an electronic device through the local technician's mobile device. For example, a local technician could physically connect the local technician's mobile device to the electronic device to provide local support by the local technician to the electronic device. The local technician could diagnose and repair problems using the local technician's mobile device.

In another implementation, a customer or a local technician could locally connect a mobile device to an electronic device, and connect a remote technician or an automated server through the network via the mobile device. By connecting the electronic device to the remote technician or the automated server, support for the electronic device could be provided through the network.

An automated server, connected through the network via a mobile device to the electronic device, could be able to accomplish support tasks without the electronic device being connected to the network directly. For example, a new installation of an orphaned device, such as a modem or a router, could be accomplished through implementations described herein. An orphaned device can include an electronic device that has been "orphaned" in that the electronic device is capable of being networked, but does not independently have a network connection. For example, an orphaned router can have no network connection due to an outage (e.g., an eroded or severed line) or due to a new installation (e.g., no network connection had been established yet). The orphaned router could be connected to the network by connecting the router to an automated server using a mobile device, automatically gathering information about the router (e.g., the identification information, model name, etc.) by the automated server, and activating the router at a customer's location (e.g., a home or office building) by the automated server. As there could be no existing network at the customer's location, a local technician can provide a connection from the router to the network through the mobile device. By connecting the mobile device to the orphaned router, the local technician could download appropriate configurations to the router through the mobile device, and do so with a level of security to protect data at the customer location.

A remote technician, connected through the network via a mobile device to the electronic device, could also accomplish support tasks for stand-alone electronic devices that do not connect to a network on their own (e.g., electronic devices that operate primarily without network connectivity). For example, a malfunctioning stand-alone electronic device can be connected to the customer's mobile device to allow a data feed between the remote technician and the malfunctioning stand-alone electronic device. By connecting the remote technician to the malfunctioning stand-alone electronic device, repair of the malfunctioning stand-alone electronic device can occur without having to install a dedicated repair network or having to send a local technician to the customer's site to enact a repair. For example, a stand-alone set-top box may contain an error message based on a software issue that makes the set-top box inoperative. The customer, of the inoperative set-top box, could connect the inoperative set-top box to their mobile device, connect their mobile device to one or more servers, and a remote technician could diagnose the software issue and remotely re-install the software to repair the inoperative set-top box, or the remote technician could assist in having the customer repair the inoperative set-top box.

Figure 2:
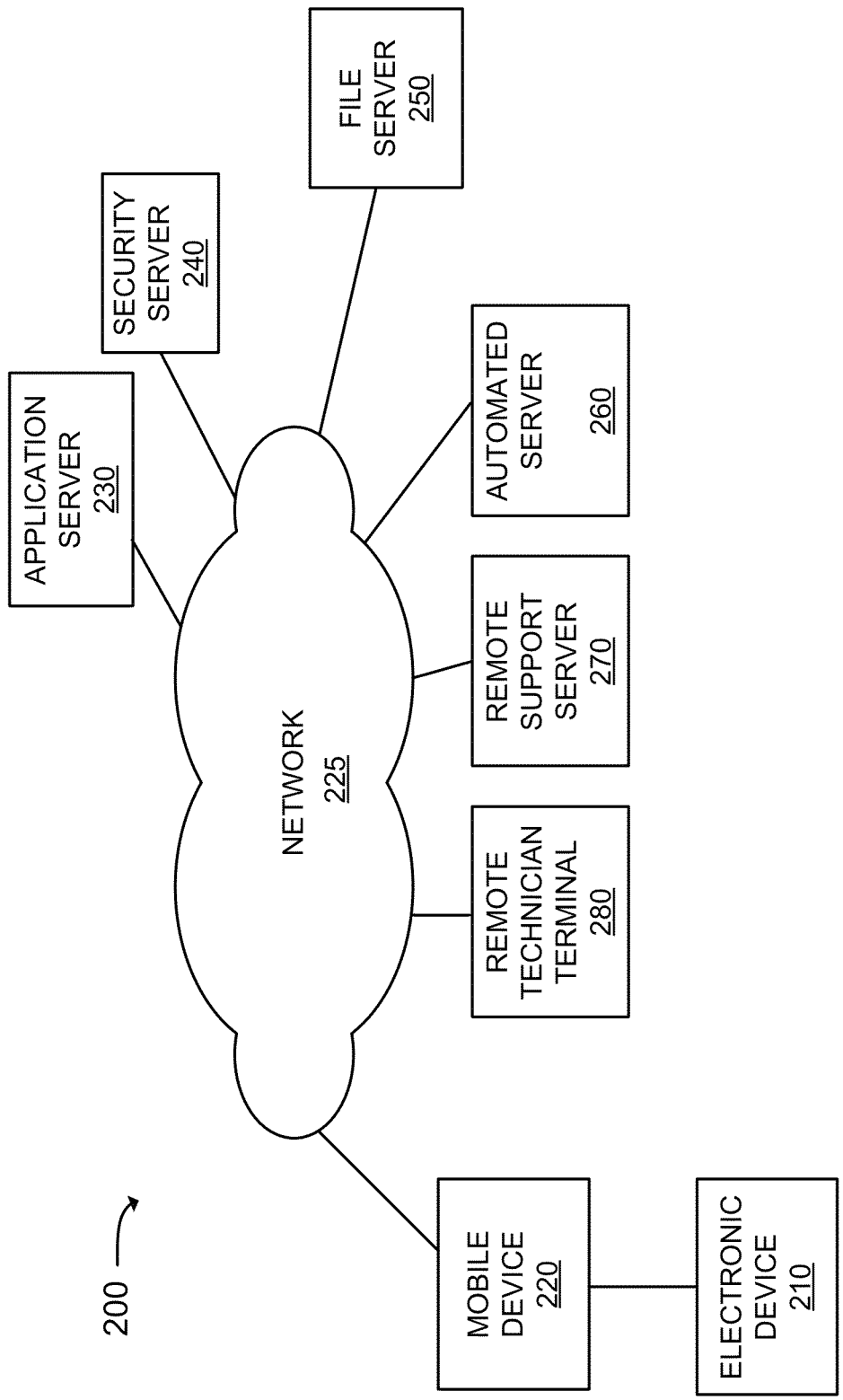
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include electronic device 210, mobile device 220, network 225, application server 230, security server 240, file server 250, automated server 260, remote support server 270, and remote technician terminal 280. The number of devices illustrated in FIG. 2 is provided for explanatory purposes only. In practice, there may be additional devices and servers; fewer devices and servers; different devices and servers; or differently arranged devices and servers than illustrated in FIG. 2. For example, application server 230, security server 240, file server 250, automated server 260, and/or remote support server 270 (herein one or more of the one or more servers are collectively referred to as "server" or "servers") may be implemented as a single server or as two or more servers, which may be co-located or remotely located.

Also, in some implementations, one or more of the devices and servers of environment 200 may perform one or more functions described as being performed by another one or more of the devices and servers of environment 200. Devices and servers of environment 200 may interconnect via wired connections, wireless connections, or a combination of wired and wireless connections.

Electronic device 210 can include any electronic device that can communicate with mobile device 220. For example, electronic device 210 can include orphaned or stand-alone devices, such as complex home appliances (e.g., set-top boxes, routers, modems, smart televisions, etc.), appliances with internal computers (e.g., laundry machines, dishwashers, water heaters, pool hardware, refrigerators, etc.), or any other electronic device 210 that can process instructions and communicate with external devices. Electronic device 210 can be accessed by a user or a local technician, who can be at the location of electronic device 210, or can be accessed by one or more servers or a remote technician located remotely to electronic device 210 through mobile device 220.

In one implementation, electronic device 210 can connect to mobile device 220 via a wired connection through a wired serial interface. For example, electronic device 210 can include a serial interface (e.g., a universal serial bus (USB)) that can be connected to a wired interface on mobile device 220.

In another implementation, electronic device 210 can connect to mobile device 220 via a wireless connection through Wi-Fi, Bluetooth, or another wireless connection. For example, a router and a smart phone can be connected through Wi-Fi.

In one implementation, electronic device 210 can be connectable to network 225. For example, electronic device 210 can be a wireless tablet that can connect to network 225, and may require a connection to mobile device 220 to assist in the connection between electronic device 210 and network 225.

In another implementation, electronic device 210 can be an independent device that is not natively connectable to network 225. For example, electronic device 210 may be a dishwasher that has a serial port, which can connect to network 225 through a serial port connection to mobile device 220.

Mobile device 220 can include any mobile device 220 that can communicate with electronic device 210. Mobile device 220 can access network 225 to communicate with any server or device connected to network 225, such as one or more of servers 230-270.

Mobile device 220 can include smart phones, laptop computers, tablet computers, net books, gaming devices, personal digital assistants (PDA), purpose-built communication devices (e.g., a mobile device 220 built for communicating with electronic device 210), or another type of mobile communication device that can transmit and receive data between electronic device 210 and network 225.

Mobile device 220 can include an application that enables communication between electronic device 210 and one or more servers 230-270. For example, mobile device 220 can include an application that can format and forward communications between electronic device 210 and application server 230 and/or other servers 240-270.

Mobile device 220 can include an application that allows a remote technician access to hardware and software on electronic device 210 for support purposes. For example, mobile device 220 can include an application that can read error messages from electronic device 210, send the error messages to application server 230, to remote support server 270, and/or to remote technician terminal 280 for access by a remote technician. By allowing access by a remote technician to electronic device 210, a local technician support call can be avoided and improved support may be provided.

Mobile device 220 can include an application that secures communication between electronic device 210 and one or more of servers 230-270. For example, mobile device 220 can include an application that connects with security server 240 to verify security information between electronic device 210, mobile device 220, and one or more of servers 230-270.

Network 225 may include one or more wired and/or wireless networks via which mobile device 220 can communicate data to and from one or more of servers 230-270 and/or remote technician terminal 280. For example, network 225 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, network 225 may include a public switched telephone network (PSTN), a Wi-Fi network, a wide area network (WAN), a metropolitan area network (MAN), an ad hoc network, an intranet, a fiber optic-based network (e.g., a fiber optic service (FiOS) network), and/or a combination of these or other types of networks.

Application server 230 may include one or more of servers that handle pairing a mobile device 220 and other servers 240-270 through network 225. For example, application server 230 can include "meet-me" or "Rendezvous" servers. Application server 230 can communicate with mobile device 220 using secure, encrypted communications via network 225, and can provide data from one or more of the other servers 240-270.

Application server 230 may communicate with mobile device 220 and one or more of the other servers 240-270 to relay information to mobile device 220 via network 225. Application server 230 can format and detect communications from various mobile device 220 applications and convert the communications to communicate with other servers 240-270. For example, application server 230 can communicate with a Microsoft Windows™ based application on mobile devices 220 or Android™ based application on mobile devices 220 and relay communications from these applications to security server 240.

Security server 240 may include authentication servers (e.g., Unified Identity Servers (UIS), Remote Authentication Dial In User Service (RADIUS) Servers, Authentication, Authorization, and Accounting (AAA) Servers, etc.) that provide networking protocols that can authenticate mobile devices 220, servers that can accept and analyze manual handshake steps (e.g., passwords, codes, personal identification numbers (PIN), etc.), and/or servers that can utilize second factor authentication (e.g., a password and a provided answer key via a voice link).

Security server 240 may generate, send, receive, and authenticate security information. In one implementation, security server 240 may generate a security code to send to mobile device 220. The security code can be entered into an application on mobile device 220 to authenticate mobile device 220 on security server 240. Security server 240 can provide authentication to application server 230, file server 250, automated server 260, and remote support server 270 to communicate with mobile device 220.

File server 250 may include one or more of storage or database servers that store information on electronic devices, such as electronic device 210. In one implementation, file server 250 stores device information, such as device model specific information, device model software, etc., on several electronic devices 210.

File server 250 can provide device information to mobile device 220, automated server 260, remote support server 270, and/or remote technician terminal 280. For example, when electronic device 210 is connected to file server 250 via mobile device 220, network 225, and/or application server 230, file server 250 can identify electronic device 210 by accessing identification data stored on electronic device 210, or by a manual entry by a user of mobile device 220.

File server 250, with identification information about electronic device 210, can find stored device information using the identification information and can provide the device information to mobile device 220, automated server 260, remote support server 270, and/or remote technician terminal 280 for use with providing support to electronic device 210.

Automated server 260 may include one or more server devices that store executable files. Automated server 260 can provide stored executable files to electronic device 210 automatically. In one implementation, an error message from electronic device 210 can be provided to automated server 260 via mobile device 220, network 225, and/or application server 230, and device information can be provided to automated server 260 via file server 250 and network 225. Automated server 260 can use the error message and the device information to determine what support issues are present, and can provide an executable file that can be communicated via mobile device 220, network 225, and/or application server 230 to electronic device 210 to clear the error.

In another implementation, automated server 260 can automatically authorize electronic device 210 for certain actions. For example, if a technician wants to authenticate a modem to provide the modem with access to network 225, then the technician can use mobile device 220 to send a message to automated server 260 via network 225 and application server 230 with an identifying feature (e.g., serial number) of the modem, which had been pre-approved for authorization. Automated server 260 can compare the pre-approved identifying feature to the pre-approved information and can automatically authenticate the modem and allow it on to network 225.

Remote support server 270 may include one or more server devices that can configure and relay information to a remote technician terminal 280 from electronic device 210, mobile device 220, application server 230, security server 240, file server 250, and/or automated server 260. Remote support server 270 can configure and relay information for remote technician terminal 280, so that remote technician terminal 280 can provide a remote technician with information to provide support to electronic device 210. For example, an error message can be received from electronic device 210, and file server 250 can provide device information, including troubleshooting steps or support documents, for a remote technician to access while the remote technician addresses the error message from electronic device 210.

Remote technician terminal 280 may provide a remote technician access to electronic device 210. Remote technician terminal 280 may be any device that allows a technician to remotely access information and/or interact with electronic device 210. In one implementation, remote technician terminal 280 can include a computing device, such as a desktop computer, a laptop computer, a tablet computer, a purpose-built communication device, a mobile phone, or other device that can interact remotely with electronic device 210.

Remote technician terminal 280 may provide access to electronic device 210 via remote support server 270, network 225, and/or mobile device 220 to provide support. In one implementation, a remote technician can repair a problem on electronic device 210 by interacting with remote technician terminal 280. For example, if electronic device 210 is a set-top box that is experiencing a software malfunction, a technician could connect to the set-top box to re-install software for the set-top box to correct the problem.

FIG. 3 is a diagram of example components of a device 300 that may correspond to electronic device 210, mobile device 220, server 230-270, or remote technician terminal 280. Alternatively, each of electronic device 210, mobile device 220, or server 230-270 may include one or more devices 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, a microphone, a touch screen, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 225. In one alternative implementation, communication interface 360 may be a logical component that includes input and output ports, input and output systems, and/or other input and output components that facilitate the transmission of data to other devices.

Device 300 may perform certain operations relating operations associated with environment 200. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4A:
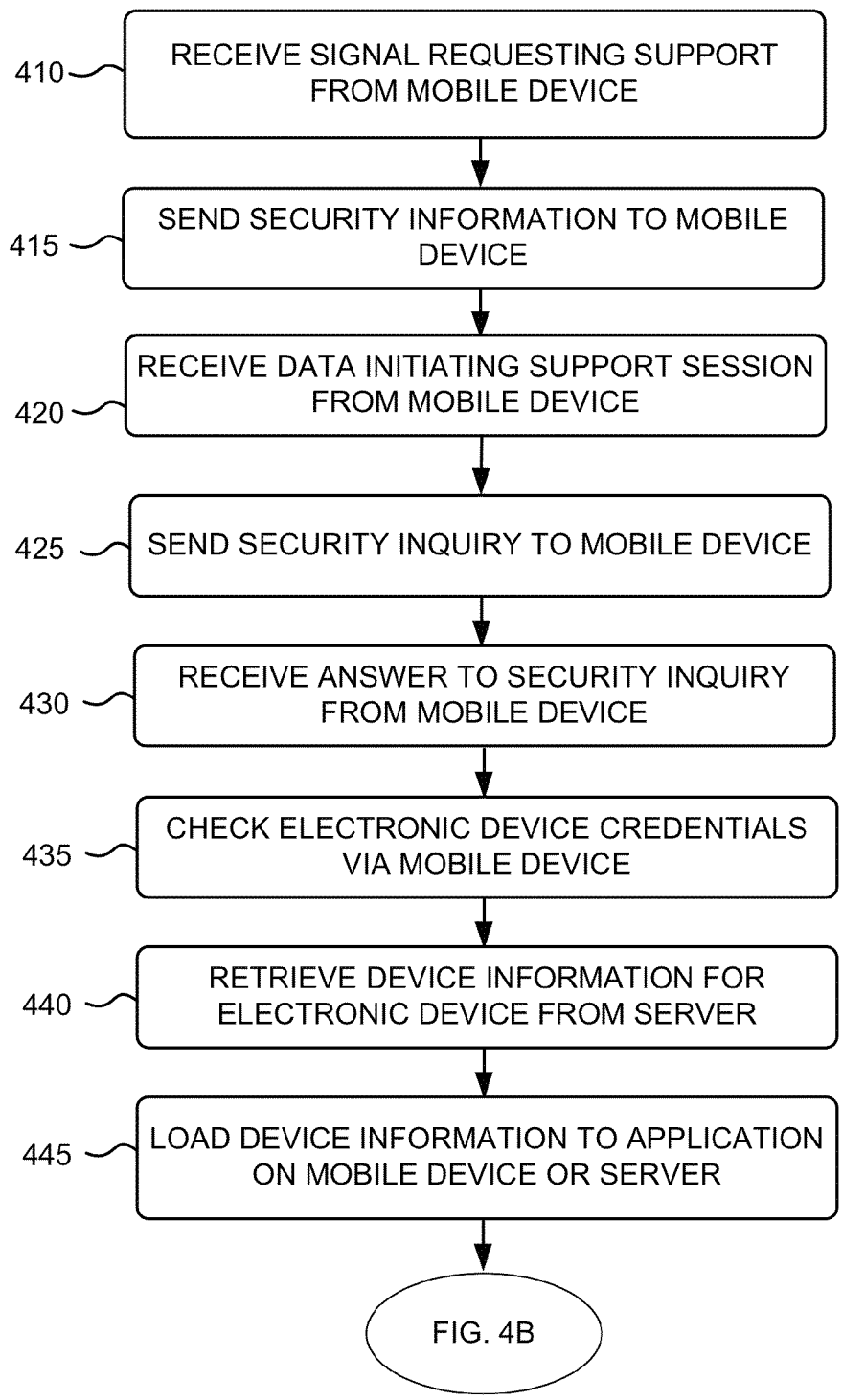
FIGS. 4A-4B are flow charts of an example process for obtaining support for an electronic device using a mobile device according to an implementation described herein.
Figure 4B:
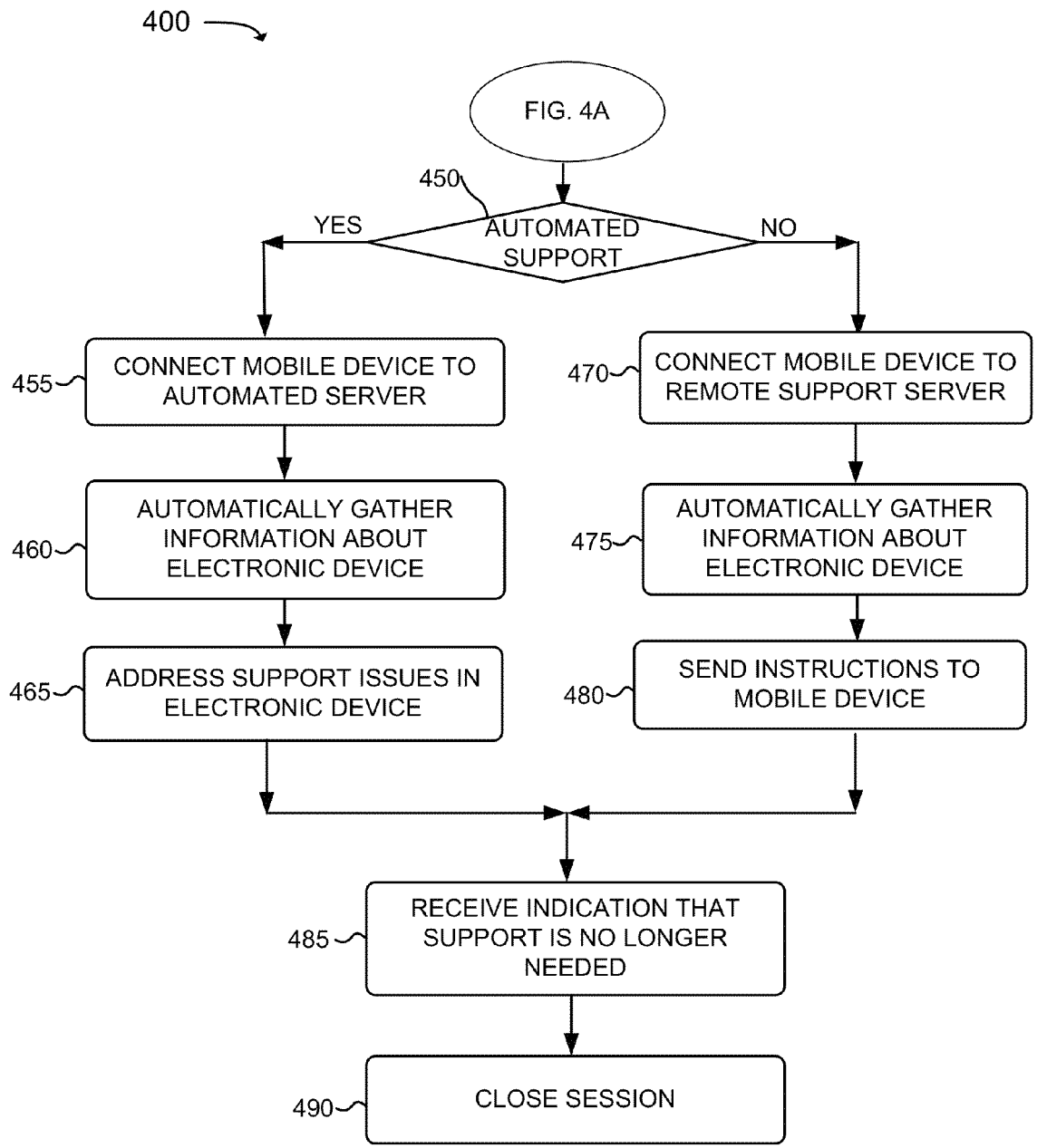

FIGS. 4A-4B are flow charts of an example process 400 for obtaining support for electronic device 210. FIG. 4A can include portions of process 400 relating to providing information from electronic device 210 through mobile device 220 to application server 230, which can distribute the information to one or more other servers 240-270. FIG. 4B can include portions of process 400 relating to providing support to electronic device 210, through mobile device 220 and network 225, using the information from electronic device 210.

In FIG. 4A, process 400 can include receiving a signal requesting support from a mobile device 220 (block 410). In one implementation, a request for support can come from a user through mobile device 220. The user can be a technician (e.g., an employee or contractor of a service provider) or a non-technician (e.g., owner or user of electronic device 210).

In one implementation, the signal requesting support can be generated through an application on mobile device 220. The application can be sent from application server 230, in response to a voice call request, or can be downloaded from an application storefront connected to network 225.

Figure 5:
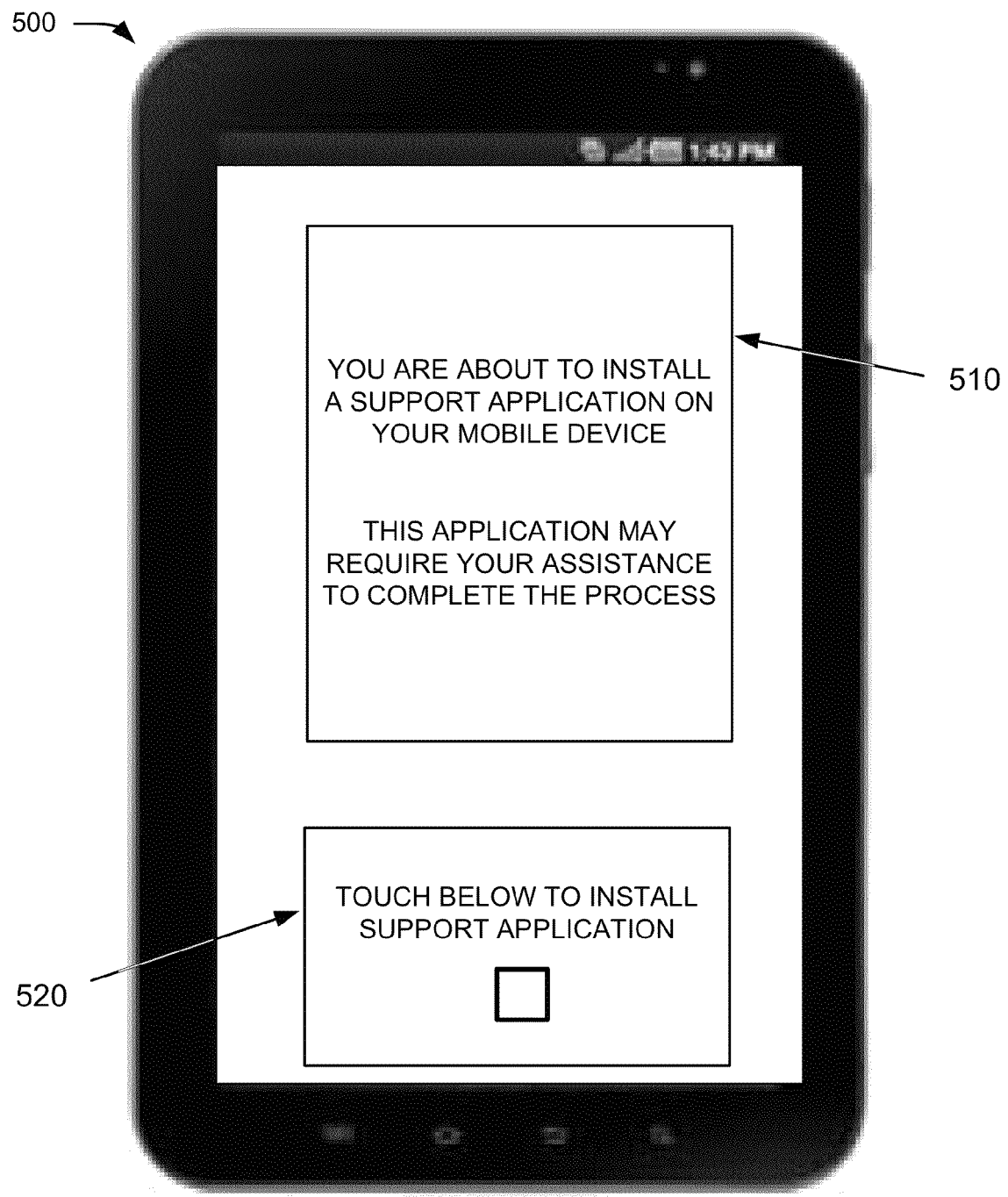
FIGS. 5-10 are diagrams of example user interfaces according to implementations described herein.

As illustrated in FIG. 5, an application can be sent to mobile device 220 from application server 230, as shown on user interface 500. In one implementation, a notification 510 regarding the installation of the application on mobile device 220 can be provided. Additionally, interaction can be required for installation of the application. The installation can require a positive acknowledgement of the installation 520 prior to the application being installed.

The application can be provided manually or automatically to mobile device 220. In one implementation, the application can be provided manually for a one-time user (e.g., an owner or user of a single electronic device 210) by application server 230 sending the application directly to the one-time user's mobile device 220. For example, application server 230 can send an executable file to mobile device 220, and installation of the application can occur upon selection of the executable file. In another implementation, the application can be provided automatically for a repeat user (e.g., a technician who provides support daily to electronic devices 210). For example, the application can be previously installed on mobile device 220 and can be activated by the technician for use with electronic device 210 when the technician is on a service call to provide support to electronic device 210.

The application can allow mobile device 220 to communicate with application server 230 to provide information to and from electronic device 210 and mobile device 220. The application can communicate via mobile device 220 to application server 230 and to one or more other servers 240-270. For example, the application can format and forward information from electronic device 210 and mobile device 220 for communication with security server 240 to secure the communication between electronic device 210 and mobile device 220 through network 225 to one or more of servers 230-270.

In one implementation, mobile device 220 can send a signal through the application to application server 230 requesting support for electronic device 210. For example, a user of mobile device 220 can connect to the application and request support, and the application can send a signal to application server 230, in response to the request indicated by the user of mobile device 220, requesting support for electronic device 210.

Returning to FIG. 4A, process 400 may include sending security information to mobile device 220 (block 415). The security information (e.g., authentication information, such as passwords, codes, PIN, etc.) can be sent from security server 240 to mobile device 220. In one implementation, the security information can be provided via voice data, network 225 data, messages (e.g., email or text message), etc.

In one implementation, the security information can be generated for the support session or for mobile device 220. For example, a PIN can be generated that can be used only for the support session, and upon conclusion of the support session, the PIN can expire. In another example, a PIN can be generated by security server 240 for mobile device 220, and the PIN can be used for any support session utilizing mobile device 220.

In one implementation, the security information can be provided by a message or a voice communication. For example, a PIN can be verbally transmitted from security server 240 to a voice communication (e.g., a phone call with an operator or other support person, or a voice message (or series of messages) from a computer, an automated, or a semi-automated source), or the PIN can be sent via a text message or email.

Process 400 may include receiving data, initiating a support session, from mobile device 220 (block 420). In one implementation, a signal from application server 230 can be sent to mobile device 220 indicating that a support session for electronic device 210 has been initiated. For example, the application on mobile device 220 can indicate that the support session has been started.

Process 400 may include sending a security inquiry to mobile device 220 (block 425). In one implementation, security server 240 can randomly or specifically select an inquiry to be sent to mobile device 220. For example, security server 240 can specifically select to inquire the security information, such as a PIN, that can be sent from security server 240 (see block 415), generated by security server 240, or pre-set by a user of mobile device 220 or electronic device 210. The security server 240 can send the security inquiry to mobile device 220 via application server 230 and network 225 for display through the application on mobile device 220. A user of mobile device 220 can provide the security information to allow access between electronic device 210 and application server 230 (or one or more of the other servers 240-270).

Figure 6:
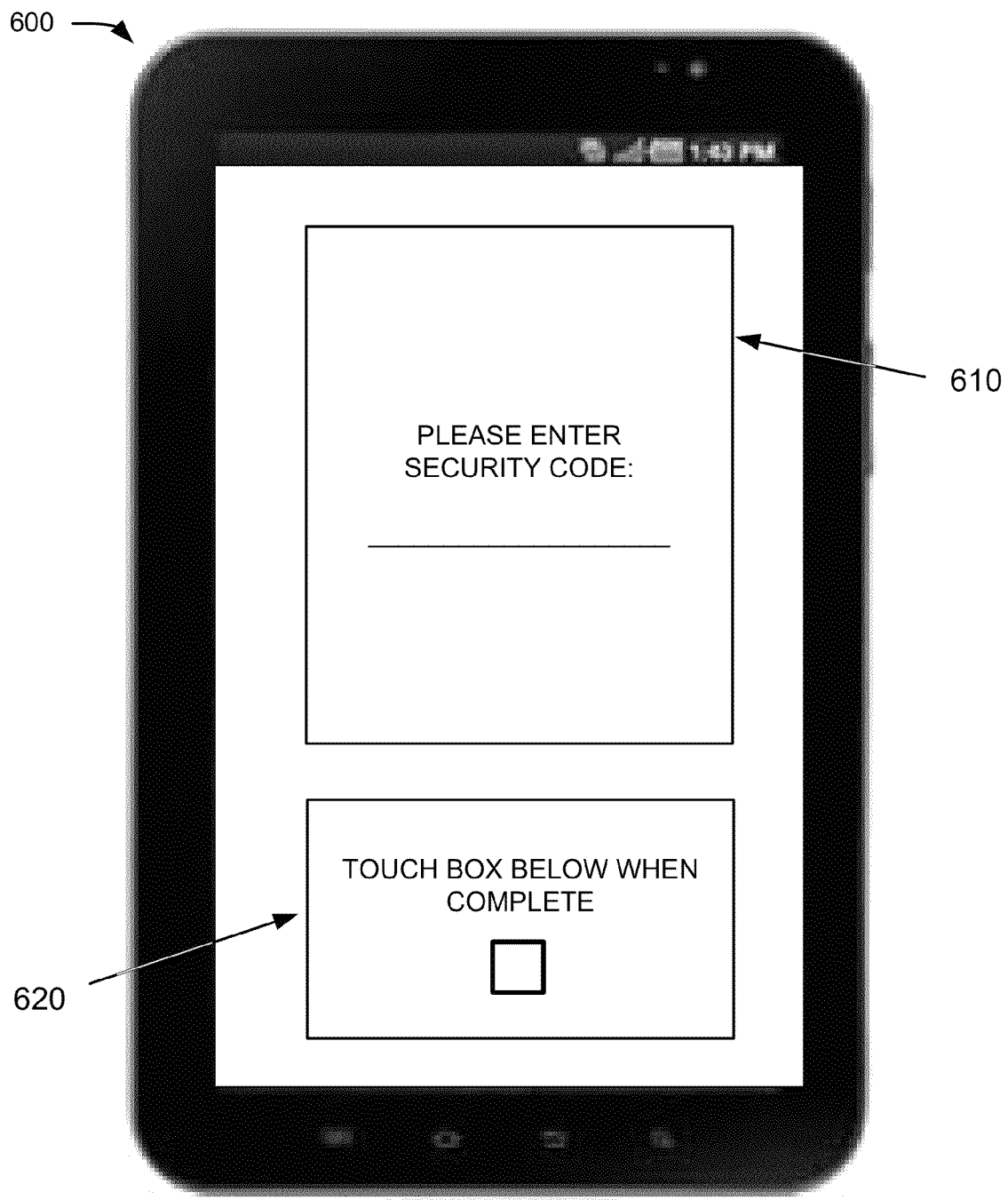

FIG. 6 is an example user interface 600 illustrating a security inquiry to mobile device 220. User interface 600 can display a question sent by security server 240 and request an answer. For example, in FIG. 6, the application can display an inquiry as to a security code 610. Additionally, the user interface 600 can display a question requesting confirmation of completion of entry 620.

Returning to FIG. 4A, process 400 may include receiving an answer to the security inquiry from mobile device 220 (block 430). In one implementation, a user of mobile device 220 can enter security information in response to the security inquiry, and security server 240 can compare the security information entered to the security information stored on security server 240. Alternatively, or additionally, identification information about mobile device 220 can be automatically discovered upon opening the support session, and the identification information about mobile device 220 can be compared to identification information stored on security server 240 to confirm identity of the user of mobile device 220.

Security server 240 can authorize mobile device 220 to communicate with one or more servers (e.g., one or more of servers 230, 250, 260, or 270) for support of electronic device 210. For example, security server 240 can allow data to be transferred between automated server 260 and mobile device 220 if the security information entered by user of mobile device 220 is correct.

Process 400 may include checking electronic device 210 credentials via mobile device 220 (block 435). Electronic device 210 credentials can include model name, model number, serial number, or any other identification credential that can identify electronic device 210 and differentiate electronic device 210 from other models and types of electronic devices 210. Electronic device 210 credentials can be entered manually, such as through a user interface, as illustrated in FIG. 7, or can be extracted automatically, such as through extracting information from electronic device 210 through a connection with mobile device 220, as illustrated in FIG. 8.

Figure 7:
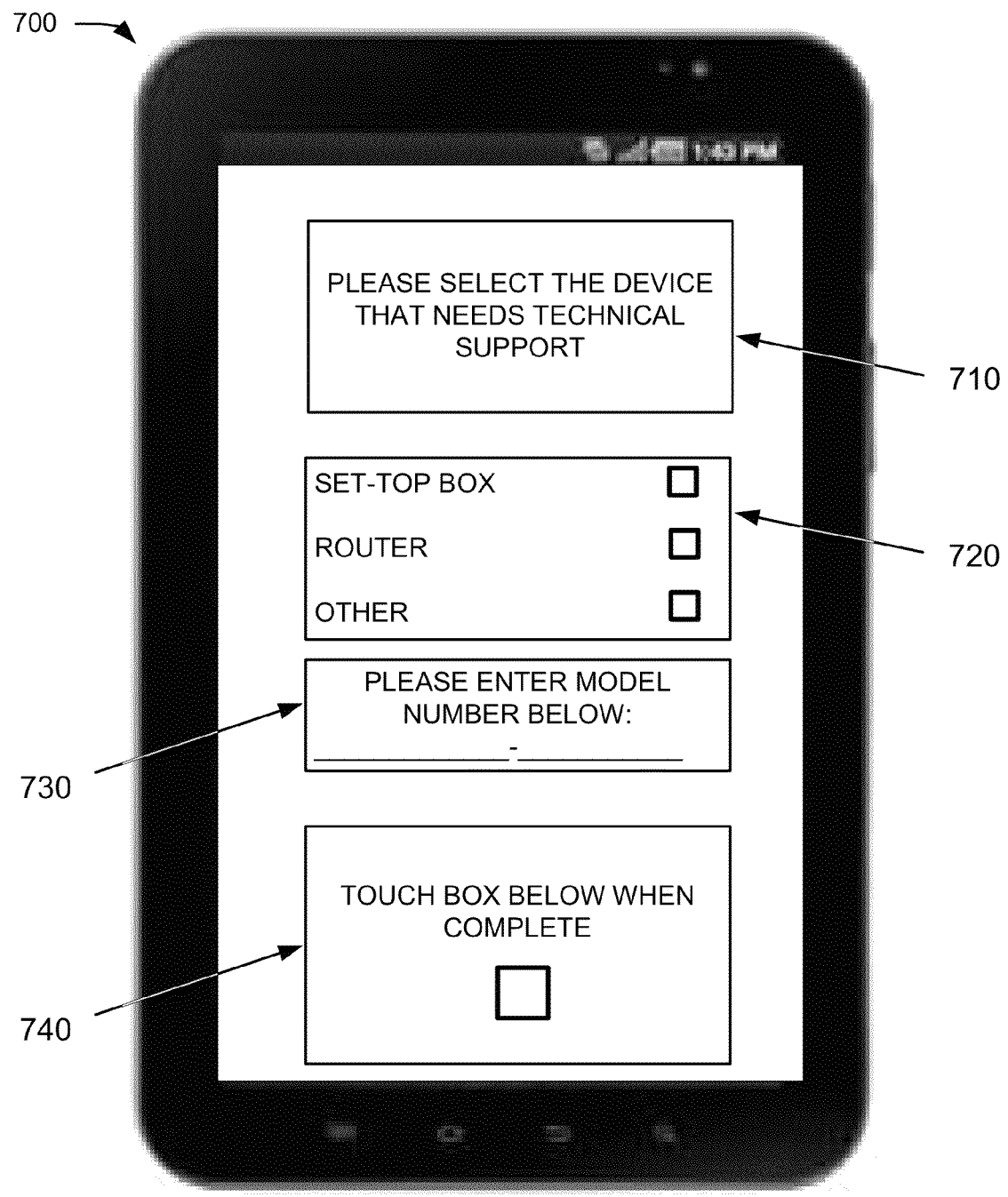

FIG. 7 illustrates an example user interface 700 for entering credentials of electronic device 210. User interface 700 can include interactive portions where device type 720 of electronic device 210 and model number 730 of electronic device 210 can be entered in response to an inquiry 710. An interactive portion of user interface 700 can be present before or after entry of device type 720 occurs. For example, the application can read device type 720 and can then populate an inquiry box requesting model number 730. Model number 730 can be specific to the device type (i.e., have an appropriate number of characters for the device type). User interface 700 can also include an interactive box 740 to send the device credentials from mobile device 220 to application server 230.

Figure 8:
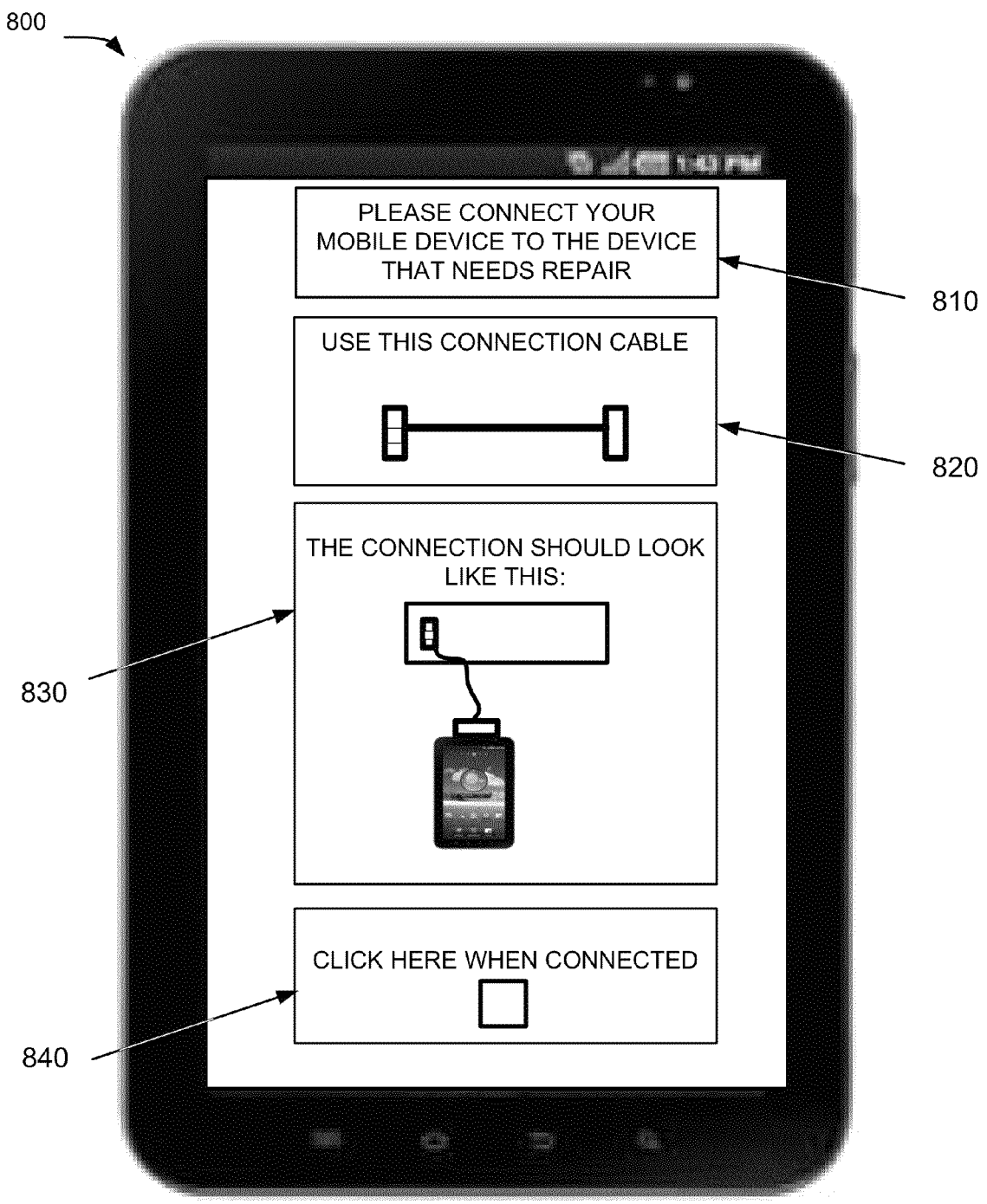

FIG. 8 illustrates an example user interface 800 illustrating instructions for connecting electronic device 210 to mobile device 220. In one implementation, assistance can be provided to a user of electronic device 210. For example, instructions can be illustrated to simplify a wired connection process for the user of electronic device 210 and mobile device 220. As illustrated, user interface 800 can include instructions 810 along with illustrations on which connection cable to use 820, along with how the connection should be made 830. Additionally, an interactive box for confirming the connection can be provided 840.

By connecting electronic device 210 to mobile device 220, device credentials can be extracted from electronic device 210 by the application on mobile device 220 and sent via network 225 to application server 230. For example, the application can include software to identify electronic device 210 in lieu of entering credentials of electronic device 210.

Returning to FIG. 4A, process 400 may include retrieving device information for electronic device 210 from one or more servers (block 440). File server 250 can receive the device credentials and can determine whether electronic device 210 has device information data associated with the device credentials. For example, if the device credentials indicate that electronic device 210 is a Model X set-top box, then file server 250 can determine whether device information data on the Model X set-top box is available. The device information data can include error codes, authentication procedures, executable software, or any other data or programs that can assist in providing support to electronic device 210. For example, device information data on a router can include executable files that can install and authorize the router to gain access to network 225. As another example, device information data on a washing machine can include software that can be loaded into the washing machine's memory to overwrite a corrupted file.

In one implementation, if the device credentials for electronic device 210 are stored on file server 250, then file server 250 can retrieve device information for electronic device 210. In another implementation, the device information can be stored on external servers or databases and can be accessed by one or more servers connected to network 225 to provide device information to mobile device 220, electronic device 210, or to one or more of servers 230-270. For example, the device information for a Brand X modem can be stored on a Brand X database, and file server 250 can connect with the Brand X database to retrieve device information on the Brand X modem.

Process 400 may include loading device information to the application on mobile device 220 and/or one or more servers in communication with mobile device 220 (block 445). Mobile device 220 and/or one or more servers 230-270 can use the device information and communication protocols to communicate between electronic device 210, mobile device 220, and/or one or more servers 230-270 because the formatting and language used by each may vary for each electronic device 210 and/or mobile device 220.

In one implementation, the device information can provide information on how to communicate between electronic device 210 and one or more servers 230-270 through mobile device 220. For example, electronic device 210 can be a router that can communicate with mobile device 220 differently than a dishwasher or a television, for example.

In FIG. 4B, process 400 may include determining whether automated support can be used (block 450). In one implementation, automated server 260 can be provided with the device information and can provide support based on the support requested, if possible. For example, if a technician requests installation and authentication of a router, and automated server 260 can install and authenticate the router automatically, then automated support would be provided by automated server 260 (block 450—YES). Alternatively, if automated server 260 cannot provide support (e.g., insufficient device information, support that the automated server 260 cannot provide, other issues that prevent automated support by automated server 260), then support can be provided by a remote technician through remote support server 270 and remote technician terminal 280 (block 450—NO).

If automated support can be provided (block 450—YES), process 400 may include connecting mobile device 220 to automated server 260 (block 455). In one implementation, connecting mobile device 220 to automated server 260 can occur via application server 230 and network 225. In another implementation, automated server 260 can connect to network 225 and mobile device 220. In another implementation, automated server 260 can connect to file server 250 to access device information and support files and can provide support to mobile device 220 through application server 230 and network 225.

Process 400 may include automatically gathering information about electronic device 210 (block 460). In one implementation, upon connection of mobile device 220 to automated server 260, automated server 260 can gather information from data located on electronic device 210. For example, automated server 260 can retrieve a data file with information about electronic device 210 without any interaction or instruction by a user of mobile device 220, a local technician, or a remote technician.

Process 400 may include addressing support issues in electronic device 210 (block 465). In one implementation, automated server 260 can access electronic device 210 and provide support for issues in electronic device 210. For example, if electronic device 210 is a router that needs installation and authentication, automated server 260 can gather information needed for installation and authentication from the router, can communicate with an installation and authentication server, and can communicate with the router to complete the installation and authentication.

Figure 9:
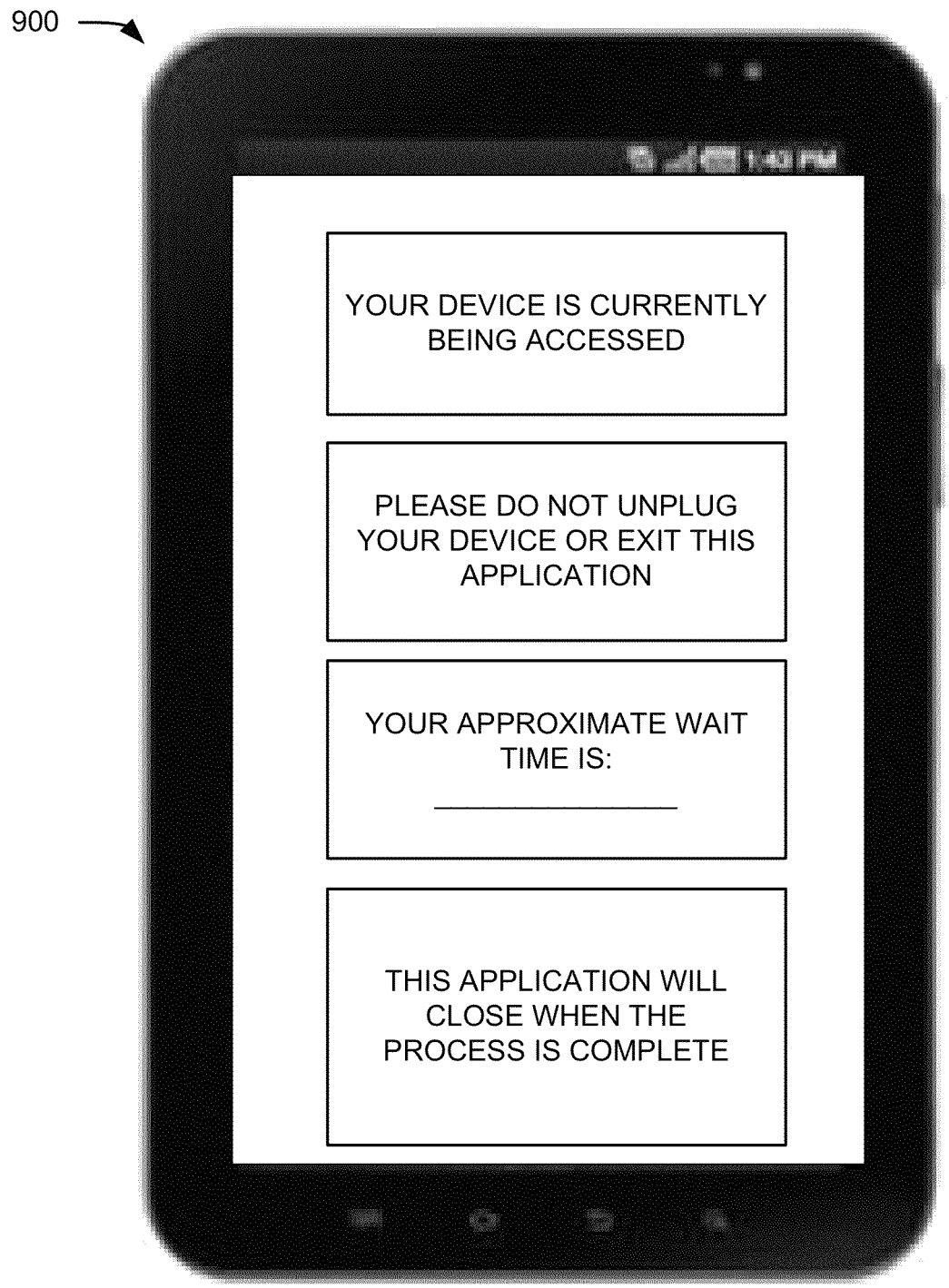

FIG. 9 illustrates an example user interface 900 which illustrates an interface that can be shown while automated server 260 accesses electronic device 210 via mobile device 220. As illustrated, various notifications, such as access by automated server 260, instructions to a user of mobile device 220, an approximate wait time, etc. can be displayed while the support issues in electronic device 210 are being addressed.

Returning to FIG. 4B, if automated support cannot be provided (block 450—NO), process 400 may include connecting mobile device 220 to remote support server 270 (block 470). In one implementation, remote support server 270 can be connected to remote technician terminal 280, and a remote technician can access mobile device 220 and electronic device 210 through remote technician terminal 280.

In one implementation, a remote technician can be provided with device information and can access electronic device 210 to address the support issues. For example, the remote technician can use remote support server 270 to connect and address support issues directly with electronic device 210 (e.g., the remote technician can install an executable program on electronic device 210 through remote support server 270 and mobile device 220).

Process 400 may also include automatically gathering information about electronic device 210 (block 475). For example, as discussed above concerning block 460, upon connection of mobile device 220 to automated server 260, automated server 260 can retrieve a data file with information about electronic device 210 without any interaction or instruction by a user of mobile device 220, a local technician, or a remote technician.

Process 400 may include sending instructions to mobile device 220 (block 480). In one implementation, instructions can be provided through the application on an interface of mobile device 220. The remote technician can access device information and can instruct the user of mobile device 220 regarding how to support electronic device 210.

In another implementation, the remote technician can instruct a user of mobile device 220 on how to address the support issues of electronic device 210. For example, the remote technician can provide step-by-step instructions to the user of mobile device 220. Step-by-step instructions may be needed if the remote technician is unable to access the parts of electronic device 210 that require support. For example, if physical buttons need to be accessed to repair electronic device 210, then the user of mobile device 220 may be able to address the support issues through instructions from the remote technician.

The instructions can be sent from the remote technician through remote technician terminal 280, remote support server 270, and/or application server 230 to network 225 and mobile device 220 for display on a user interface of mobile device 220.

Figure 10:
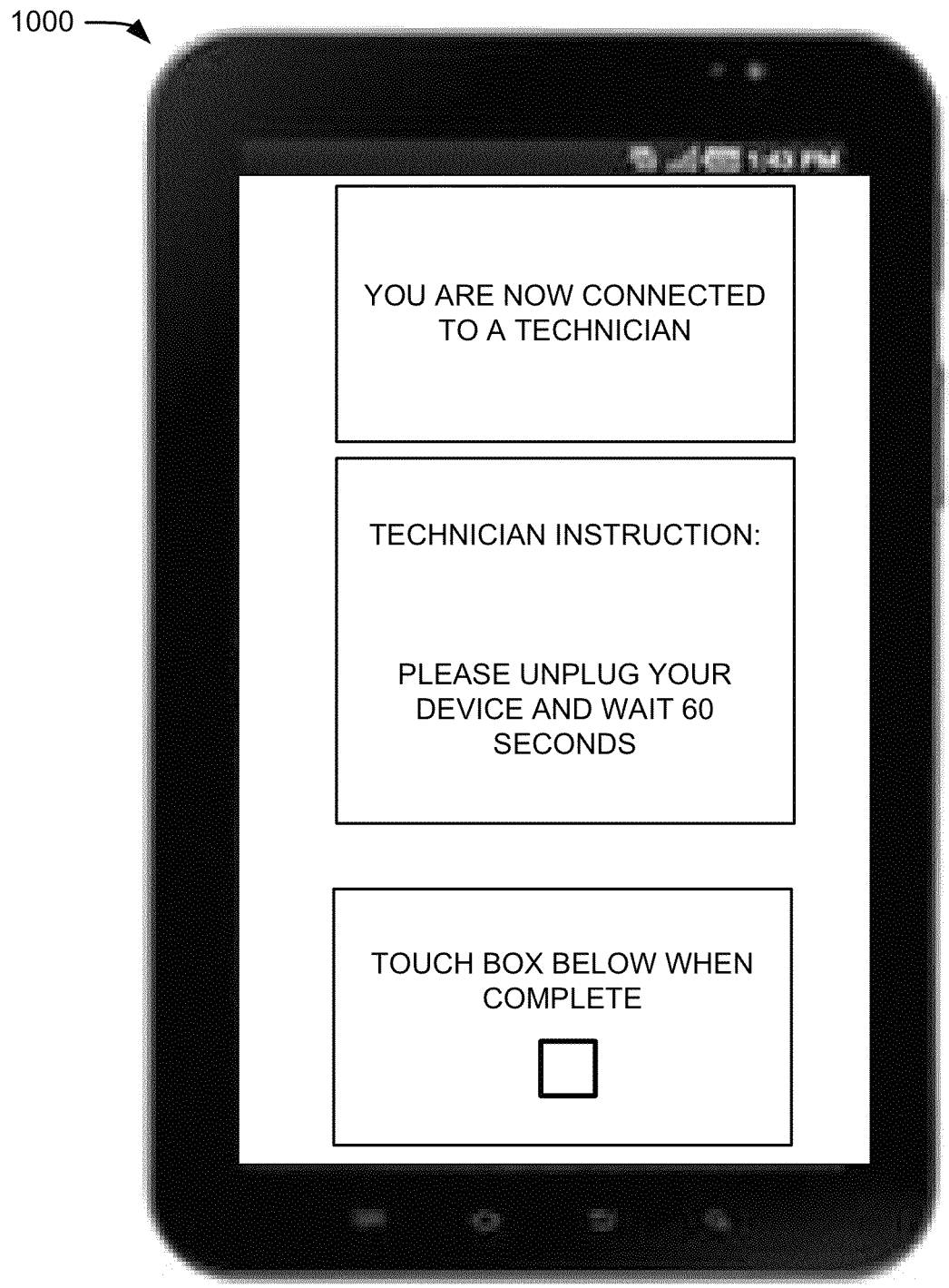

FIG. 10 illustrates example user interface 1000 that can communicate instructions from a remote technician to a user of mobile device 220. As illustrated, the user of mobile device 220 can be informed that there is a connection with a technician, along with instructions from the technician. Upon completion of each instruction, an interactive box can be activated to signal the remote technician to continue to the next instruction. Additionally, an instant messaging (IM) session, voice session, video conference session, etc. could be established with technician.

Returning to FIG. 4B, process 400 may include receiving an indication that support is no longer needed (block 485). In one implementation, a user of mobile device 220 can indicate that support is no longer needed because electronic device 210 is now working.

Process 400 may include closing the session (block 490). In one implementation, the session can be closed because notification is received that electronic device 210 no longer requires support or because mobile device 220 and/or electronic device 210 is no longer accessible. For example, notification can be received that electronic device 210 has been repaired. As another example, mobile device 220 can lose its connection to electronic device 210, network 225, or application server 230. As another example, electronic device 210 can be inaccessible due to failure of hardware or other the connection with mobile device 220.

In one example of process 400, a technician can arrive to set up electronic device 210 at an office building and has problems with setting up electronic device 210 such that electronic device 210 is not yet in service. The technician can connect the technician's mobile device 220 to network 225 and can run an application to request a secure connection to application server 230. The technician can enter a job code and electronic device 210 identification, and authorization of the technician's mobile device 220 can be provided by security server 240.

File server 250 can match electronic device 210 identification with information on file server 250, which can include configuration information and instruction information, for electronic device 210. The application can inform the technician how to connect electronic device 210 and mobile device 220.

The application can confirm the connection and can load electronic device 210 configurations from automated server 260 to electronic device 210. This can allow the technician to load a secure configuration without ever seeing, knowing, or having configuration or security information in the technician's personal possession. Caching of the configuration information may also be allowed on the application if the configuration can be retained in an encrypted application memory. The configuration information can be destroyed when the installation is complete. Additionally, common configurations or files (e.g., non-sensitive information) can be stored locally on the technician's mobile device 220 or at a network server (e.g., a cloud server).

Electronic device 210 is now configured and mobile device 220 can be disconnected. Additionally, because sensitive data is not stored on mobile device 220, removal of the sensitive data is not necessary.

In another example of process 400, a customer can have technical problems with electronic device 210 at the customer's home. The customer can call technical support (e.g., a remote technician) and technical support may not be able to resolve the problems verbally. Additionally, technical support cannot remotely access electronic device 210 over network 225 due to the technical problems with electronic device 210.

Technical support can request that the customer download a support application. The support application can contact application server 230 and can display a session identification number or code to the customer. The customer can then tell technical support the session identification and technical support can connect to the support application on customer's mobile device 220. Once connected, application server 230 can prompt the customer for additional security, such as further questions to confirm the identity of the customer and electronic device 210. Technical support can then provide corrective action to electronic device 210 or can instruct the customer on how to take corrective action to solve the technical problems of electronic device 210 without requiring a technician to be present at the customer's house and while providing a secure connection between electronic device 210 and technical support. Upon correction of the technical problems, mobile device 220 can be disconnected.

The systems and/or methods may provide a mechanism by which electronic device 210 can be provided support. The systems and/or methods may use mobile device 220 to provide communication for electronic device 210 through network 225.

The foregoing description provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 4A-4B, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   sending, by the one or more server devices and to a mobile device, data initiating a session between the one or more server devices and the mobile device;
   sending, by the one or more server devices and to the mobile device, information associated with connecting the mobile device to an electronic device,
      the information associated with connecting the mobile device to the electronic device being provided for display via a display of the mobile device;
   receiving, by the one or more server devices from the mobile device, an indication indicating the mobile device has been connected to the electronic device,
      the indication being input via a user interface of the mobile device;
   obtaining, by the one or more server devices and from the mobile device, device credentials for the electronic device,
      the device credentials being obtained by the mobile device, from the electronic device, based on the mobile device being connected to the electronic device;
   obtaining, by the one or more server devices and based on the device credentials, device information associated with the electronic device,
      the device information including information associated with communicating with the electronic device through the mobile device;
   providing, by the one or more server devices and to the mobile device, the device information associated with the electronic device;
   automatically gathering information, by the one or more server devices, about the electronic device from data stored on the electronic device using the device information and communication protocols to communicate with the electronic device via the mobile device; and
   providing support to the electronic device via the mobile device,
      the providing the support including:
         providing an executable file to the electronic device through the mobile device,
            the electronic device executing the executable file based on the executable file being provided to the electronic device.

2. The method of claim 1, further comprising:
   establishing a secure, encrypted connection between the one or more server devices and the mobile device via a cellular network.

3. The method of claim 1, where the providing the support to the electronic device includes:
   providing instructions to the electronic device from a technician through the mobile device.

4. The method of claim 1, further comprising:
   generating security information;
   storing security information;
   sending security information to the mobile device;
   receiving security information from the mobile device;
   comparing the received security information and the stored security information; and
   authenticating the mobile device when the received security information matches the stored security information.

5. The method of claim 1, further comprising:
   sending a request for connecting the electronic device to the mobile device via a wired serial port.

6. The method of claim 1, where the electronic device is a stand-alone electronic device,
   where providing the support includes:
      sending, via the mobile device, one or more of:
         instructions from a technician, or
         a file from the one or more server devices, and
   where the stand-alone electronic device operates without network connectivity.

7. The method of claim 1, where the electronic device is an orphaned electronic device, and
   where the method further comprises:
      authorizing the orphaned electronic device to connect to the network,
         where the orphaned electronic device executes the executable file to connect to the network.

8. A system comprising:
   one or more server devices to:
      send data initiating a session between the one or more server devices and a mobile device;
      send information for connecting the mobile device to a stand-alone electronic device,
         the information for connecting the mobile device to the stand-alone electronic device being provided for display via a display of the mobile device;
      receive information indicating that the mobile device is connected to the stand-alone electronic device;
      obtain, from the mobile device, device credentials for the stand-alone electronic device,
         the device credentials being obtained by the mobile device, from the stand-alone electronic device, based on the mobile device being connected to the stand-alone electronic device;
      obtain, based on the device credentials, device information associated with the stand-alone electronic device,
         the device information including information associated with communicating with the stand-alone electronic device through the mobile device;
      provide the device information to the mobile device;
      gather information about the stand-alone electronic device from data stored on the stand-alone electronic device using the device information and communication protocols to communicate with the stand-alone electronic device via the mobile device; and
      provide executable instructions to the stand-alone electronic device, via the mobile device, to permit the stand-alone electronic device to execute the executable instructions to provide support to the stand-alone electronic device.

9. The system of claim 8, where the one or more server devices are further to:
   establish a secure, encrypted connection between the one or more server devices and the mobile device via a cellular network.

10. The system of claim 8, where, when providing the executable instructions, the one or more server devices are to:
   provide, through the mobile device, instructions to the stand-alone electronic device from a technician.

11. The system of claim 10, where the mobile device is connected to the stand-alone electronic device via a wireless connection, and
   where the mobile device gathers information from the stand-alone electronic device via the wireless connection.

12. The system of claim 8, where the one or more server devices are further to:
   generate security information;
   store security information;
   send security information to the mobile device;
   receive security information from the mobile device;
   compare the received security information and the stored security information; and
   authenticate the mobile device when the received security information matches the stored security information.

13. The system of claim 8, where the mobile device is connected to the stand-alone electronic device via a wired serial port, and
   where the mobile device gathers information from the stand-alone electronic device via the wired serial port.

14. The system of claim 8, where the stand-alone electronic device comprises an appliance,
   where the mobile device comprises a smart phone,
   where the appliance includes a set-top box, a smart television, a dishwasher, a laundry machine, a refrigerator, a water heater, or pool hardware, and
   where the one or more server devices provide the support to the appliance through the smart phone.

15. A system comprising:
   one or more server devices to:
      store security information associated with a mobile device;
      receive, from the mobile device, a request for support associated with an electronic device;
      receive security information from the mobile device;
      authenticate the mobile device by comparing the stored security information to the received security information;
      provide, to the mobile device, information associated with connecting the mobile device to the electronic device,
         the information associated with connecting the mobile device to the electronic device being provided for display via a display of the mobile device;
      receive, from the mobile device, an indication indicating that the mobile device is connected to the electronic device;
      obtain, from the mobile device, device credentials for the electronic device,
         the device credentials being obtained by the mobile device, from the electronic device, based on the mobile device being connected to the electronic device; and
      provide, via the mobile device and based on receiving the indication, the electronic device with an executable file, to permit the electronic device to execute the executable file to enable the electronic device to access a network independent of the mobile device,
         the executable file being obtained based on the device credentials.

16. The system of claim 15, where the one or more server devices are further to:
   send data initiating a session between the one or more server devices and the mobile device;
   send a request for first information about the electronic device;
   receive the requested first information about the electronic device;
   identify the device credentials for the electronic device and communication protocols for communicating with the electronic device;
   provide the device credentials for the electronic device and the communication protocols for communicating with the electronic device;

gather second information about the electronic device from data stored on the electronic device using the communication protocols and the mobile device; and provide, based on the second information about the electronic device, instructions to the electronic device via the mobile device.

17. The system of claim 16, where, when gathering the second information, the one or more server devices are to:

automatically download data from the electronic device after the mobile device is authenticated.

18. The system of claim 15, where the mobile device is connected to the electronic device via a wired serial port, and where the mobile device gathers information from the electronic device via the wired serial port.

19. The system of claim 15, where the mobile device is connected to the electronic device via a wireless connection, and where the mobile device gathers information from the electronic device via the wireless connection.

20. The system of claim 15, where the electronic device comprises a router or a modem, and where the mobile device comprises a smart phone.

\* \* \* \* \*